United States Patent
Mimura et al.

[11] Patent Number: 6,120,280
[45] Date of Patent: Sep. 19, 2000

[54] MICROPRISM MASTER MOLD

[75] Inventors: Ikuo Mimura; Keiji Adachi, both of Sano, Japan

[73] Assignee: Nippon Carbide Kogyo Kabushiki Kaisha, Tokyo, Japan

[21] Appl. No.: 09/000,454

[22] PCT Filed: Jul. 26, 1996

[86] PCT No.: PCT/JP96/02118

§ 371 Date: Jan. 28, 2000

§ 102(e) Date: Jan. 28, 2000

[87] PCT Pub. No.: WO97/04940

PCT Pub. Date: Feb. 13, 1997

[30] Foreign Application Priority Data

Jul. 28, 1995 [JP] Japan ................................. 7-211329

[51] Int. Cl.[7] ................................................ B29D 11/00
[52] U.S. Cl. ..................... 425/195; 249/104; 249/140; 249/155; 264/1.34; 264/1.9; 264/2.5; 425/DIG. 30
[58] Field of Search .............................. 264/1.9, 1.1, 2.5, 264/1.31, 1.34; 249/140, 141, 102, 104, 155; 425/195, 193, 183, DIG. 30, 470

[56] References Cited

U.S. PATENT DOCUMENTS

| | | | |
|---|---|---|---|
| Re. 29,396 | 9/1977 | Heenan | 425/DIG. 30 |
| 1,591,572 | 7/1926 | Stimson | 425/DIG. 30 |
| 2,029,375 | 2/1936 | James . | |
| 2,205,638 | 6/1940 | Stimson | 264/1.9 |
| 2,380,447 | 7/1945 | Jungersen . | |
| 2,538,638 | 1/1951 | Wilson | 264/1.9 |
| 3,069,721 | 12/1962 | Arni et al. . | |
| 3,277,535 | 10/1966 | Rupert | 249/141 |
| 3,417,959 | 12/1968 | Schulz | 425/470 |
| 3,443,281 | 5/1969 | Walby | 249/141 |
| 3,649,153 | 3/1972 | Brudy | 249/117 |
| 3,712,706 | 1/1973 | Stamm . | |
| 3,899,154 | 8/1975 | Tanaka | 249/117 |
| 3,922,065 | 11/1975 | Schultz . | |
| 3,926,402 | 12/1975 | Heenan | 425/DIG. 30 |
| 4,066,236 | 1/1978 | Lindner | 425/DIG. 30 |
| 4,073,568 | 2/1978 | Heasley . | |
| 4,095,773 | 6/1978 | Lindner | 249/117 |
| 4,243,618 | 1/1981 | Van Arnam . | |
| 4,588,258 | 5/1986 | Hoopman . | |
| 4,733,946 | 3/1988 | Cossetti | 264/1.9 |
| 4,775,219 | 10/1988 | Appeldorn et al. . | |
| 5,764,413 | 6/1998 | Smith et al. | 264/2.5 |
| 5,889,615 | 3/1999 | Dreyer et al. | 264/1.9 |

FOREIGN PATENT DOCUMENTS

| | | |
|---|---|---|
| 5-680572 | 6/1981 | Japan . |
| 6-141518 | 2/1986 | Japan . |

*Primary Examiner*—Duane S. Smith

[57] ABSTRACT

A microprism master mold is formed from a plurality of flat sheets having two mutually parallel major surfaces. On one edge thereof, there is provided a series of V-shaped grooves having a bottom angle of about 90° and roof-shaped projections having a vertical angle of about 90°, successively formed at a fixed repeating pitch and in a direction perpendicular to the major surfaces. The flat sheets are stacked so that the vertices of the roof-shaped projections formed on each flat sheet meet the bottoms of the V-shaped grooves formed on an adjacent flat sheet. The microprism master mold includes two or more different types of roof-shaped projections and the thickness of each flat sheet is equal to 0.6–2.0 times the length of the shorter oblique sides of the roof-shaped projections. The master mold is useful for production of cube-corner type retroreflectors characterized by microprism having high brightness and excellent wide-angle properties. The retroreflective sheeting produced with the microprism master mold may be thin and flexible.

14 Claims, 8 Drawing Sheets

PRIOR ART

FIG. 4

PRIOR ART

MICROPRISM MASTER MOLD

TECHNICAL FIELD

This invention relates to microprism master molds which can be used in the production of cube-corner type retroreflectors (i.e., articles reflecting most of the incident light back toward the light source). More particularly, it relates to a microprism master mold which can preferably be used in the production of retroreflective elements useful in signs such as road signs and construction signs, license plates for vehicles such as automobiles and motorcycles, safety goods such as safety clothing and life-saving devices, markings such as signboards, reflectors for visible light or laser light reflection sensors, and the like, as well as retroreflective sheeting composed of such retroreflective elements and having excellent wide-angle properties.

BACKGROUND ART

Conventionally, retroreflective sheeting capable of reflecting incident light back toward the light source have been well known, and such sheeting is widely used in the above-described fields of application owing to its retroreflectivity. Among others, retroreflective sheeting utilizing the retroreflection principle of prisms, such as cube-corner type retroreflective sheeting, has markedly higher optical retroreflection efficiency than conventional retroreflective sheeting using micro glass beads, and the range of its use is expanding year by year because of its excellent retroreflection performance.

On the basis of their principle of reflection, cube-corner type retroreflective elements exhibit good retroreflectivity, so long as the angle between the optical axis of a prism type reflective element (sometimes referred to simply as "prism element") (i.e., an axis lying at an equal distance from three mutually perpendicular faces constituting the prism element) and incident light (i.e., the angle of incidence) is small. However, cube-corner type retroreflective elements have the disadvantage that, as the angle of incidence increases, their retroreflection efficiency is reduced. Moreover, when rays of light are incident on a prism face at an angle greater than the critical angle satisfying the conditions for total internal reflection which are determined according to the ratio of the refractive index of the transparent medium constituting the retroreflective element to the refractive index of air, most of them do not undergo total reflection at the interfaces of the prism element but pass to the backside of the prism. Thus, they have the additional disadvantage that the range of the angle of incidence which permits retroreflection is limited.

In order to overcome these disadvantages, various attempts have been made to improve the method of making a mold used for the formation of prisms. Now, some typical methods of making a prism mold which have been proposed in the prior art are described below.

(1) Bundled pin method (U.S. Pat. Nos. 1,591,572, 3,922,065 and 2,029,375):

This is a method in which a large number of metallic pins having a prism formed at the tip thereof are bundled to form an array of prisms. This method is characterized in that the design of the prism formed at the tip of each pin may be arbitrarily modified and is suitable for the production of relatively large prisms. However, it is not practicable when the formation of, for example, more than 2,000 microprisms per square centimeter is required as dictated by the primary object of the present invention.

(2) Plate method (U.S. Pat. Nos. 1,591,572, 3,069,721 and 4,073,568):

This is a method for forming a microprism mold of the hexagonal prism type which comprises stacking a plurality of flat sheets having two mutually parallel major surfaces, cutting therein V-shaped grooves in a direction perpendicular to the major surfaces and at a fixed pitch to form a series of successive roof-shaped projections having a vertical angle of about 90°, and then shifting the flat sheets so that the vertices of the roof-shaped projections formed on each flat sheet meet the bottoms of the V-shaped grooves formed on an adjacent flat sheet. This method is characterized by a relatively high degree of design freedom, though it is lower than that of the bundled pin method. This method can improve the poor productivity in the fabrication of a prism mold which constitutes a disadvantage of the above-described bundled pin method. However, this method has the disadvantage that, when it is desired to form microprisms, the insufficient strength of flat sheets may cause them to become distorted during the cutting of V-shaped grooves, and has hence been used for the production of relatively large prisms.

(3) Triangular prism method (U.S. Pat. Nos. 3,712,706 and 2,380,447):

This is a method in which V-shaped grooves extending in three different directions are cut in a surface of a flat plate made of a metal or the like to form an array of prisms thereon. This method has frequently been employed for the production of conventional retroreflective sheeting using prism elements. The reasons for this are that it is relatively easy to form microprisms by cutting and that thin retroreflective sheeting may be obtained because it is possible to form an array in which the bases of the formed triangular prisms are arranged in a common plane. However, this method has the disadvantage that the prism shape which can be employed is limited to triangular prisms capable of being formed by V-groove cutting and its degree of design freedom is low.

Next, the properties desired for retroreflective sheeting and the problems involved in cube-corner type retroreflective sheeting using prism elements are described below.

Generally, the basic properties desired for retroreflective sheeting include high brightness properties (i.e., the highness of reflective brightnesses as represented by the reflective brightness of light incident on the sheeting from a direction perpendicular to the surface thereof) and good wide-angle properties. Moreover, wide-angle properties involve the following three considerations.

A first consideration relating to wide-angle properties is observation angle characteristics. Where retroreflective sheeting is used, for example, in various markers such as traffic signs, the position of the viewer is usually different from that of the light source. Accordingly, more intense light must reach the viewer positioned away from the optical axis of the incident light. To this end, it is necessary that the reduction in reflective brightness be small even at large observation angles.

A second consideration relating to wide-angle properties is incident angle characteristics. For example, when an automobile is coming nearer to a traffic sign, the incident angle of light emitted by the headlamps of the automobile to the sign increases gradually, and the intensity of the light reaching the driver being the viewer decreases correspondingly. In order to cause the sign to retain sufficiently high brightness even when the driver comes near to the sign, excellent incident angle characteristics are required.

A third consideration relating to wide-angle properties is rotation angle characteristics. A phenomenon peculiar to prism elements is such that retroreflective brightness varies according to the direction from which light is incident on retroreflective sheeting. Consequently, retroreflective sheeting involves a troublesome problem in that control over the direction of bonding is required in bonding the retroreflective sheeting to signs. Micro glass bead type retroreflective sheeting does not involve this problem because the reflective elements have the form of a body of revolution.

Cube-corner type retroreflective sheeting using prism elements is usually said to be characterized in that the frontal retroreflective brightness thereof is two to three times as high as that of retroreflective sheeting using micro glass beads. The reason for this is said to be that the latter tends to show a reduction in retroreflection efficiency because glass beads generally used in micro glass bead type retroreflectors are optically imperfect for lens elements and tend to produce spherical aberration or because a metallic reflective film formed on reflective surfaces has low reflectivity, whereas prism elements used in the former cube-corner type retroreflective sheeting permit the formation of optical elements having relatively high accuracy. On the other hand, cube-corner type retroreflective sheeting is generally said to have poor wide-angle properties.

Thus, prism elements have higher reflective brightness than glass beads, but are unsatisfactory in wide-angle properties. In order to improve the wide-angle properties of prism elements, further investigation is required with respect to the above-described three types of characteristics. They are more specifically described hereinbelow.

Observation Angle Characteristics:

The beam of light reflected by retroreflective sheeting must have a certain degree of divergence and reach the viewer positioned away from the optical axis of the incident light. To this end, it is necessary to design the retroreflective sheeting so that the reflected light will spread with a small angle of divergence. This can be accomplished by varying the prism edge angles made by adjacent faces of the prism elements very slightly from their theoretical value of 90°, by curving the reflective faces of the prism elements slightly, or by utilizing a diffraction effect exerted by the minute prism elements.

On the basis of the relative positions of the headlamps of a transport vehicle (e.g., a large-sized truck) and its driver, the observation angle is usually at most about 3°. Accordingly, the aforesaid angle of divergence should be controlled so as to exceed this maximum observation angle slightly.

Incident Angle Characteristics:

Generally, as the angle of incidence increases, the retroreflection efficiency of retroreflective sheeting is reduced. The reason for this is that, in order to satisfy trihedral reflection requirements based on the retroreflection principle of cube corners, the angle of incidence must be relatively close to 0°, i.e., light must be incident on the retroreflective sheeting from a direction substantially perpendicular to the surface thereof. If the angle of incidence becomes greater, the light may fail to reach a second or third reflective prism face and escape out of the prism, resulting in a reduction in retroreflection efficiency. This disadvantage is pronounced especially when triangular prisms are used, and can be mitigated to some extent by using hexagonal prisms. Moreover, if the angle of incidence exceeds a certain limit, the conditions for total internal reflection are not satisfied, so that the incident light passes to the back side of the prism.

In order to overcome the above-described disadvantages, there has generally been employed a method wherein the optical axes of the prism elements, which are conventionally oriented so as to be perpendicular to the surface of the retroreflective sheeting, are slightly tilted in various directions to increase their retroreflection efficiency in the tilting directions.

For example, in the triangular prism method, it has been proposed to vary slightly the angle of intersection of V-shaped grooves which generally intersect with each other at an angle of 60° (U.S. Pat. Nos. 4,588,258 and 4,775,219). Since the optical axes tilted by this method are obtained only in the form of pairs of prisms rotated 180° with respect to one another and facing in opposite directions, an improvement in wide-angle properties can be achieved in the directions of tilting of the optical axes, but no improvement is achieved in other directions. Moreover, no improvement in rotation angle characteristics is achieved.

In order to overcome the above-described disadvantage that the conditions for total internal reflection are not satisfied when the angle of incidence exceeds a certain limit, it has been proposed to coat the reflective faces of prisms with a metal film or the like and thereby cause specular reflection (U.S. Pat. Nos. 3,712,706 and 2,380,447). However, this method has the disadvantage that the resulting sheeting has a dark appearance and the metal film is susceptible to moisture or the like.

Rotation Angle Characteristics:

Rotation angle characteristics pose a serious problem especially in the case of triangular prisms. In order to improve rotation angle characteristics, there is known a method in which the prism array surface is divided into a plurality of zones and the angular orientation of the prisms present in each zone is changed (see U.S. Pat. No. 4,243,618). In this method, the rotation angle of light incident on the prisms differs from zone to zone, and the reflective brightness varies correspondingly. When viewed from a long distance, these reflective brightnesses are leveled to give uniform rotation angle characteristics. However, the zones of the prism array surface can be rather clearly seen from the front side of the retroreflective sheeting, and hence have the disadvantage that the appearance of the sheeting is reduced in attractiveness.

When hexagonal prisms are employed, the shape of the elements resembles a circle more closely. As a result, the failure of trihedral reflection occurs less frequently, resulting in only a slight reduction in rotation angle characteristics. The approximate region of a prism element in which trihedral reflection can be achieved is represented by the inscribed circle thereof, and this occupies about 60% of the projected area of the prism element for triangular prisms and about 90% for hexagonal prisms.

Moreover, in prism molds which can be applied to the fields of application of the present invention and can be used for the production of relatively thin and flexible retroreflective sheeting, it is desirable that the prism elements have a minute size, for example, of 500 $\mu$m or less. However, it is difficult to produce such reflective sheeting according to the above-described bundled pin method and plate method. The triangular prism method permits the formation of minute prisms, but it is difficult to carry out the design of prisms having excellent wide-angle properties as dictated by another object of the present invention.

In the aforementioned U.S. Pat. No. 1,591,572 to Stimson, there is described a method for making a prism mold by using glass rods or sheets having one end formed into the shape of a prism or prisms. However, the flat sheets used in the method described therein has such low strength that this method is not suitable for the formation of microprisms desired in thin retroreflective sheeting as dictated by an object of the present invention.

It is described in the aforementioned U.S. Pat. No. 3,069, 721 to Arni et al. that optically flat metal faces can be obtained by cutting flat metal sheets with a diamond cutter and that prism sheeting can be formed by using prism-forming metal sheets obtained by this method. However, neither description nor suggestion is given therein as to the improvement of microprism characteristics by combining two or more different types of roof-shaped projections.

It is an object of the present invention to provide a master mold which can be applied to the production of cube-corner type retroreflectors, especially in the form of thin and flexible retroreflective sheeting, and permits the formation of microprisms having high brightness properties and excellent wide-angle properties, by focusing attention on the above-described plate method and overcoming its disadvantages while maintaining its advantages.

DISCLOSURE OF THE INVENTION

According to the present invention, there is provided a microprism master mold comprising a plurality of flat sheets having two mutually parallel major surfaces and provided on one edge thereof with a series of V-shaped grooves having a bottom angle of about 90° and roof-shaped projections having a vertical angle of about 90° which are successively formed at a fixed repeating pitch and in a direction perpendicular to the major surfaces, the flat sheets being stacked so that the vertices of the roof-shaped projections formed on each flat sheet meet the bottoms of the V-shaped grooves formed on an adjacent flat sheet, characterized in that the microprism master mold includes two or more different types of roof-shaped projections and in that the thickness of each flat sheet is equal to 0.6–2.0 times the length of the shorter oblique sides of the roof-shaped projection.

The present invention will be more specifically described hereinbelow with reference to the accompanying drawings.

BRIEF DESCRIPTION OF THE DRAWINGS

FIG. 1(I) is a sectional view, taken in a direction parallel to the major surfaces, of a flat sheet for use in the plate method which forms the basis of the microprism master mold of the present invention, and FIG. 1(II) is a side view of the flat sheet as viewed from a direction perpendicular to the direction of the thickness;

DETAILED DESCRIPTION OF THE INVENTION

Figure 1:
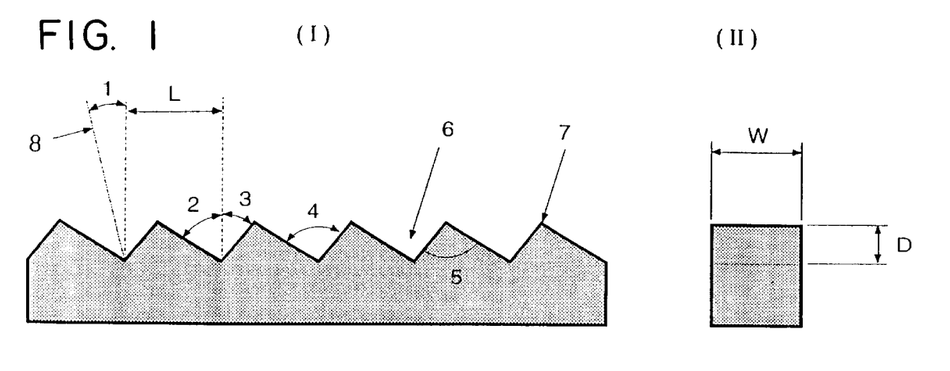

In FIG. 1(I), numeral 1 designates the tilt angle of V-shaped grooves 6, numeral 4 designates the bottom angle of V-shaped grooves 6, and numeral 5 designates the vertical angle of roof-shaped projections 7. Numeral 8 designates the projection of the optical axis of a prism on this sectional view, and the projection of the tilt angle of the optical axis of the prism on this sectional view coincides with the tilt angle 1 of the V-shaped groove. When the V-shaped grooves are cut on one side after the other with unilateral cutting angles 2 and 3, the tilt angle 1 of the V-shaped grooves is expressed by one-half of the difference between unilateral cutting angles 2 and 3, and the bottom angle 4 of the V-shaped grooves is expressed by the sum of unilateral cutting angles 2 and 3. V-shaped grooves 6 and roof-shaped projections 7 are successively formed at a fixed repeating pitch L. Moreover, in FIG. 1(II), the thickness of the flat sheet is designated by W and the depth of the V-shaped grooves by D.

Figure 2:
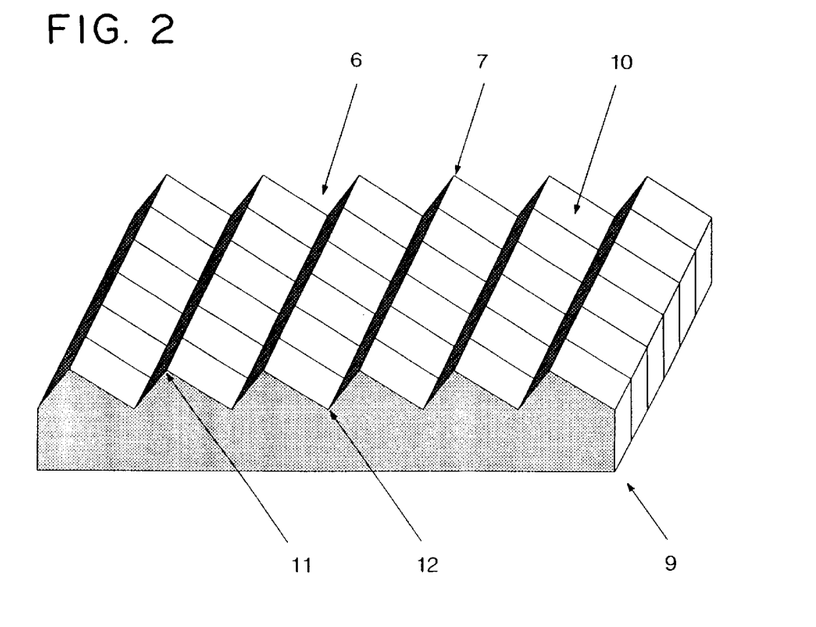
FIG. 2 is a perspective view of a group of flat sheets comprising a combination of a large number of flat sheets as illustrated in FIG. 1.

In FIG. 2, roof-shaped projections 7 are formed by V-shaped grooves 6 cut perpendicularly in a group of flat sheets 9. Numeral 10 designates a V-shaped groove cutting surface which forms a reflective face of prisms. Numerals 11 and 12 designate the vertex of a roof-shaped projection and the bottom of a V-shaped groove, respectively.

Figure 3:
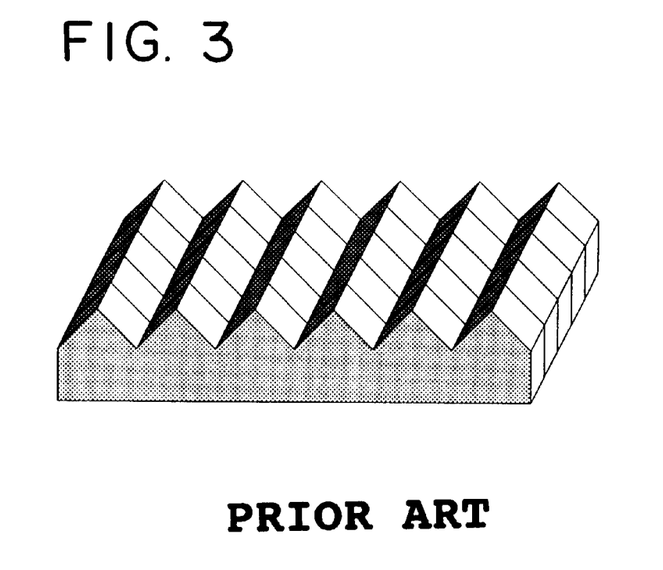
FIG. 3 is a perspective view of a group of flat sheets used in the plate method according to the prior art.
Figure 4:
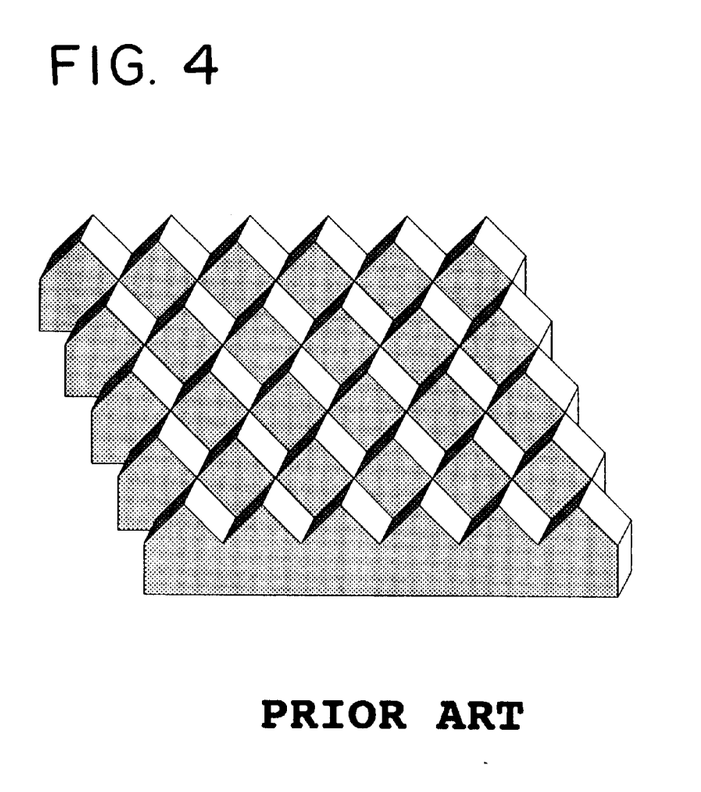
FIG. 4 is a perspective view of a cube-corner type microprism master mold formed from the group of flat sheets illustrated in FIG. 3.

FIG. 3 is a perspective view of a group of flat sheets used in the previously described plate method according to the prior art. This figure illustrates a group of flat sheets obtained by stacking a plurality of flat sheets having two mutually parallel major surfaces and successively forming V-shaped grooves having a bottom angle of 90° and roof-shaped projections having a vertical angle of 90° in a direction perpendicular to the major surfaces and at a fixed repeating pitch, according to a V-shaped groove cutting process. Moreover, FIG. 4 illustrates that a cube-corner type microprism master mold can be made by shifting the group of flat sheets illustrated in FIG. 3 so as to cause the vertices of the roof-shaped projections formed on each flat sheet to meet the bottoms of the V-shaped grooves formed on an adjacent flat sheet.

The basic principle of the present invention is such that a microprism master mold capable of forming prism elements meeting characteristic requirements is designed by using a combination of two or more types of roof-shaped projections of different shapes formed on flat sheets constituting the microprism master mold (in which the shape of roof-shaped projections may differ from sheet to sheet, or each flat sheet may have two or more types of roof-shaped projections of different shapes) and modifying the combination properly, and/or by further using a combination of flat sheets having different thicknesses as the plurality of flat sheets constituting the microprism master mold.

Now, the characteristics required of prism elements and the design of a microprism master mold used for the formation of prism elements having such characteristics are described below.

High Brightness Properties:

Cube-corner type retroreflective sheeting using prism elements is characterized in that the frontal retroreflective brightness thereof is two to three times as high as that of micro glass bead type retroreflective sheeting. The reason for this is said that prism elements permits the formation of optical elements having relatively high accuracy. Accordingly, it is still required in the present invention that the prism edge angles made by the three reflective faces forming each prism element be about 90°.

Moreover, it is also required that the smoothness of reflective prism faces 10 be achieved so as to minimize light scattering at reflective prism faces 10. To this end, it is recommendable to, in forming roof-shaped projections on flat sheets, cut V-shaped grooves according to a machining process such as fly cutting while using a cutting tool having a natural diamond mounted at its tip. The accuracy of cutting should preferably be such that the resin prisms formed with the prism master mold obtained by this machining process have an average surface roughness (Ra) of not greater than 0.05 µm and more preferably not greater than 0.01 µm.

As the material being cut, namely the material used for the group of flat sheets 9 being cut, there may preferably be employed synthetic resin materials having a homogeneous structure, metallic materials consisting of a single metal and having fine grain boundaries, and alloy materials having a fine and uniform crystal structure as a result of heat treatment or the like. These materials are preferred because grain boundaries scarcely produce irregularities of the cut surfaces and hence provide smooth reflective prism faces.

Among the synthetic resin materials which can suitably be used for the fabrication of flat sheets in the present invention, those having a glass transition temperature of 150° C. or above and, in particular, 200° C. or above and a Rockwell hardness (JIS Z2245) of not less than 70 and, in particular, not less than 75 are preferred, for example, because they seldom have the disadvantage of softening during cutting and thereby making high precision cutting difficult. Specific examples thereof include polyethylene terephthalate resin, polybutylene terephthalate resin, polycarbonate resins, polymethyl methacrylate resin, polyimide resins, polyarylate resins, polyethersulfone resins, polyetherimide resins and cellulose triacetate resin.

The fabrication of flat sheets from a synthetic resin as described above may be carried out according to an ordinary resin forming technique such as extrusion molding, calendering or solution casting. If necessary, the resulting flat sheets may be subjected to additional treatments such as heat treatment and stretching. The major surfaces of the flat sheets so fabricated may be subjected to a preliminary conductivity treatment, in order to facilitate a conductivity treatment and/or an electroforming process which will be carried out to form an electroformed mold from the prism master mold made by the method of the present invention. As the preliminary conductivity treatment, there may be employed vacuum evaporation involving the deposition of a metal such as gold, silver, copper, aluminum, zinc, chromium, nickel or selenium; cathode sputtering using such a metal; or electroless plating using copper or nickel. Alternatively, the flat sheets themselves may be made electrically conductive by incorporating an electrically conductive fine powder (e.g., carbon black) or an organic metallic salt into the synthetic resin.

Among the metallic materials which can suitably be used for the fabrication of flat sheets in the present invention, those having a Vickers hardness (JIS Z2244) of not less than 350 and, in particular, not less than 380 are preferred. Specific examples thereof include amorphous copper and electrodeposited nickel. Specific examples of the alloy materials include copper-zinc alloys, copper-tin-zinc alloys, nickel-cobalt alloys and nickel-zinc alloys.

Observation Angle Characteristics (variation in vertical angle):

One method for causing the beam of retroreflected light to spread with a small angle of divergence is to vary the prism edge angles made by adjacent faces of the prism elements slightly from their theoretical value of 90°. As described previously, this makes it possible to accomplish the object of improving observation angle characteristics.

A variation in the prism edge angles (i.e., the vertical angles 5 of roof-shaped projections) can be produced by varying the bottom angles 4 of cut V-shaped grooves slightly from 90°. The angles so varied may be slightly less or greater than 90°. Moreover, it is unnecessary to vary the bottom angles of all V-shaped grooves, and the bottom angles may be varied at a certain repeating pattern. Thus, excessive spreading of the retroreflected light can be prevented by varying not all but only some of the vertical angles of the roof-shaped projections, which makes it possible to achieve more excellent observation angle characteristics.

The vertical angles 5 of the roof-shaped projections should preferably be varied in the range of 89.83° to 90.17°. If the vertical angles are in the aforesaid range, the resulting retroreflectors are preferred, for example, because they do not have the disadvantage that excessive spreading of the reflected light causes a reduction in the intensity of light reaching the viewer.

In the present invention, a broader range of observation angle characteristics can be achieved by providing each flat sheet with two or more types of roof-shaped projections having different vertical angles 5 in a fixed repeating pattern. The reason for this is that, when the vertical angles of the roof-shaped projections are varied slightly from 90°, light is retroreflected in a direction deviating slightly from the entrance axis of the light, thus making it possible to distribute the retroreflected light at angles corresponding to variations in the vertical angle of each roof-shaped projection.

Figure 5:
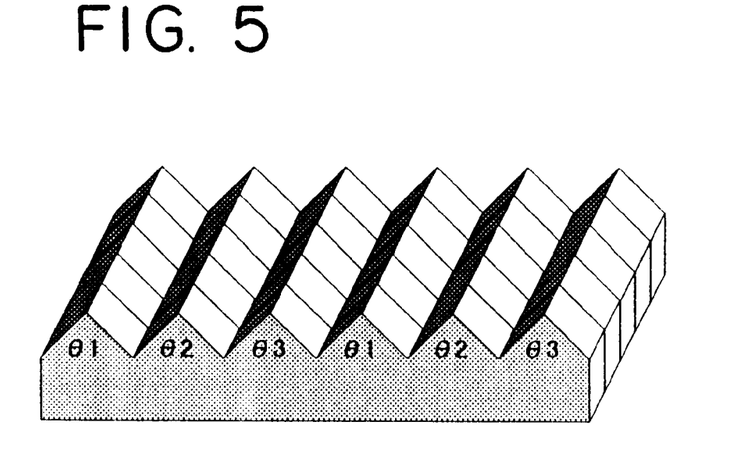
FIG. 5 is a perspective view of a group of flat sheets in which three types of symmetrical roof-shaped projections having different vertical angles are formed on each flat sheet.
Figure 6:
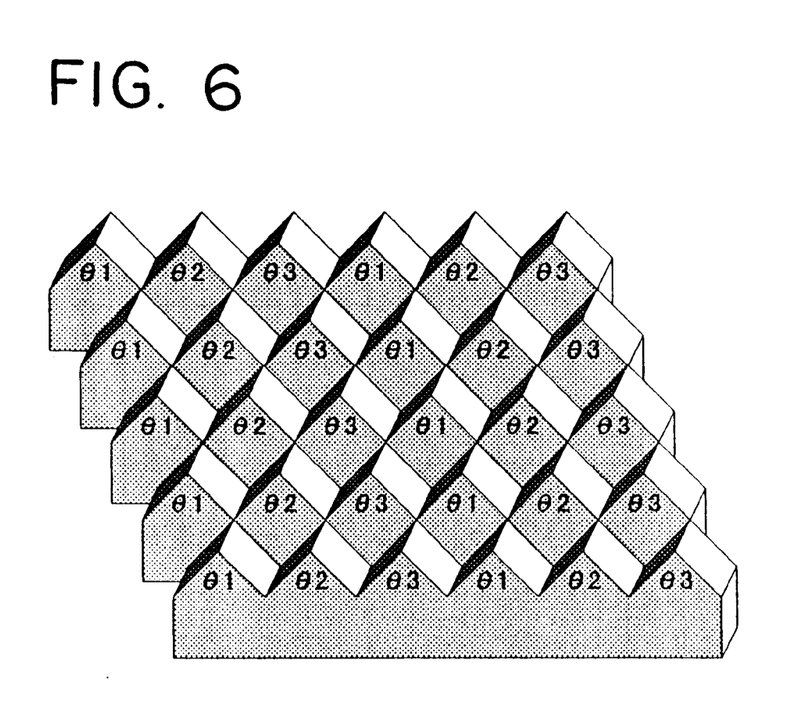
FIG. 6 is a perspective view of a cube-corner type microprism master mold in accordance with one embodiment of the present invention which is formed from the group of flat sheets illustrated in FIG. 5.

FIG. 5 is a perspective view of a group of flat sheets in which three types of symmetrical roof-shaped projections having different vertical angles are formed on each flat sheet, and FIG. 6 is a perspective view of a cube-corner type microprism master mold in accordance with one embodiment of the present invention which is formed from the group of flat sheets illustrated in FIG. 5.

In FIG. 5, the vertical angles θ1, θ2 and θ3 of roof-shaped projections corresponding to the cutting angles at which the V-shaped grooves adjacent to the respective roof-shaped projections are formed. FIG. 5 indicates that these angles are equal to 90° or slightly different from 90° and are arranged in a repeating pattern.

FIG. 6 illustrates a microprism master mold obtained by shifting the flat sheets so that the vertices of the roof-shaped projections formed on each flat sheet meet the bottoms of the V-shaped grooves formed on an adjacent flat sheet.

In order to avoid excessive spreading of the retroreflected light, it is advisable to cut V-shaped grooves so that the bottom angles of the V-shaped grooves vary within ±10' (i.e., the bottom angles are in the range of 89.93° to 90.17°). According to the method for varying the vertical angles of the roof-shaped projections in accordance with the present invention, roof-shaped projections having different heights will be formed because V-shaped grooves having different bottom angles are cut in an identical flat sheet. Accordingly, if a group of flat sheets provided with such roof-shaped projections having different heights are shifted so that the vertices of the roof-shaped projections on each flat sheet meet the bottoms of the V-shaped grooves in the roof-shaped projections formed on an adjacent flat sheet, the vertices of some projections may fail to meet the corresponding bottoms. However, when the angular variations are within ±10', the resulting error in height will be as small as about 0.3 μm if flat sheets having a thickness of 50 μm are used, and as small as about 3 μm even if flat sheets having a thickness of 500 μm are used. Consequently, no practical difficulty will arise in the formation of an array of prisms.

Incident Angle Characteristics (1)—V-shaped Groove Tilt Angle:

Among improvements in wide-angle properties, an improvement in incident angle characteristics can be achieved by tilting the optical axes of the prism elements in various directions.

In the present invention, first of all, a series of roof-shaped projections are formed by cutting V-shaped grooves while tilting the center line of each V-shaped groove (i.e., the bisector of the bottom angle of the V-shaped groove—line 8 shown in FIG. 1) suitably to the right or left side. This makes it possible to form V-shaped grooves having a desired tilt angle 1 (i.e., an angle of deviation from a direction perpendicular to the surface of the retroreflective sheeting) and thereby form asymmetrical roof-shaped projections. Thus, the optical axes of the prism elements can be tilted leftward or rightward in a plane parallel to the major surfaces of the flat sheets.

Figure 7:
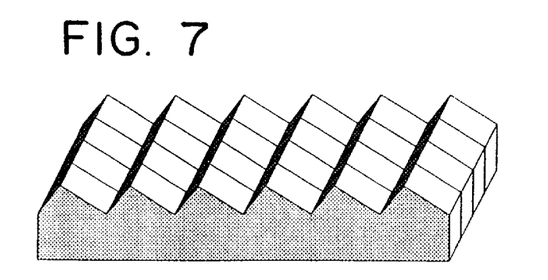
FIG. 7 is a perspective view of a group of flat sheets in which similar asymmetrical roof-shaped projections having a vertical angle of 90° and having optical axes titled in the same direction are formed.
Figure 8:
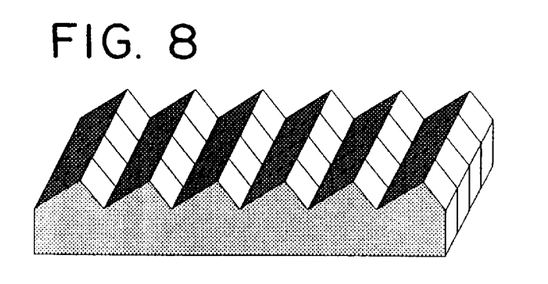
FIG. 8 is a perspective view of a group of flat sheets in which similar asymmetrical roof-shaped projections having a vertical angle of 90° and having optical axes titled in the direction opposite to that shown in FIG. 7 are formed.
Figure 9:
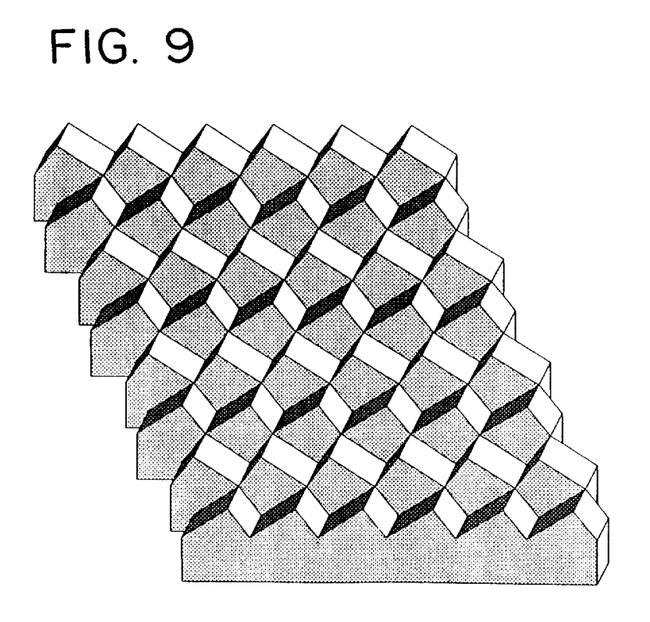
FIG. 9 is a perspective view of a cube-corner type microprism master mold in accordance with another embodiment of the present invention which is formed from a combination of the two types of flat sheets illustrated in FIGS. 7 and 8.

FIG. 7 is a perspective view of a group of flat sheets in which similar asymmetrical roof-shaped projections having a vertical angle of 90° and having optical axes titled in the same direction are formed, FIG. 8 is a perspective view of a group of flat sheets in which similar asymmetrical roof-shaped projections having a vertical angle of 90° and having optical axes titled in the direction opposite to that shown in FIG. 7 are formed, and FIG. 9 is a perspective view of a cub-corner type microprism master mold in accordance with another embodiment of the present invention which is formed from a combination of the two types of flat sheets illustrated in FIGS. 7 and 8.

The groups of flat sheets illustrated in the aforesaid FIGS. 7 and 8 are each obtained by cutting asymmetrical V-shaped grooves having an identical tilt angle. Such asymmetrical V-shaped grooves may be cut by using a cutting tool having a tip angle of 90° while tilting it by a desired tilt angle, or by cutting each V-shaped groove on one side after the other with a cutting tool having a definite acute tip angle while tilting it by a desired tilt angle. In the latter case, V-shaped grooves having any desired tilt angle can be cut, provided that the sum of the two unilateral cutting angles is adjusted to 90°.

Let us suppose that, when the V-shaped grooves (or optical axes) are tilted to the left side (or in the counterclockwise direction) with respect to a direction perpendicular to the surface of the retroreflective sheeting, the tilt angle thereof is expressed by a negative value, and when they are tilted to the right side (or in the clockwise direction), the tilt angle thereof is expressed by a positive value. Then, in the present invention, the tilt angle 5 of the V-shaped grooves should preferably be in the range of −15° to +15° and more preferably −10° to +10°, inclusive of the case in which the V-shaped grooves are not tilted (i.e., the tilt angle thereof is 0°). If the absolute value of the tilt angle is not greater than 15° (i.e., the tilt angle is not greater than +15° or not less than −15°), this is preferable because the retroreflection performance for frontal incident light is not reduced. Moreover, when the V-shaped grooves are tilted, the absolute value of the tilt angle thereof should preferably be not less than 5°. If the absolute value of the tilt angle is not less than 5° (i.e., the tilt angle is not less than +5° or not greater than −5°), this is preferable because the tilted optical axes produce beneficial effects such as excellent incident angle characteristics.

In order to secure excellent incident angle characteristics in all directions of the sheeting, it is necessary to tilt the V-shaped grooves not in one direction but in at least leftward and rightward directions. Specifically, in a group of flat sheets on which roof-shaped projections having an identical shape are formed by cutting asymmetrical V-shaped grooves according to a single cutting process as illustrated, for example, in FIG. 7 or 8, every other sheet may be reversed sideways. Thus, the optical axes can be tilted leftward and rightward as illustrated in FIG. 9. Moreover, in FIGS. 7 and 8, more uniform incident angle characteristics can be obtained by using a combination of two or more flat sheets in which a series of similar roof-shaped projections are formed in each sheet, but the shape of roof-shaped projections differs from sheet to sheet.

Furthermore, if the above-described method for improving observation angle characteristics by varying the vertical angles of roof-shaped projections slightly is used in combination, the vertical angles of the roof-shaped projections and the tilt angles of the V-shaped grooves may be varied in various ways and at the same time, thus making it possible to tilt the optical axes in various directions. This may be considered to be a preferred embodiment of the present invention because improvements in observation angle characteristics and incident angle characteristics can be achieved at the same time.

Figure 10:
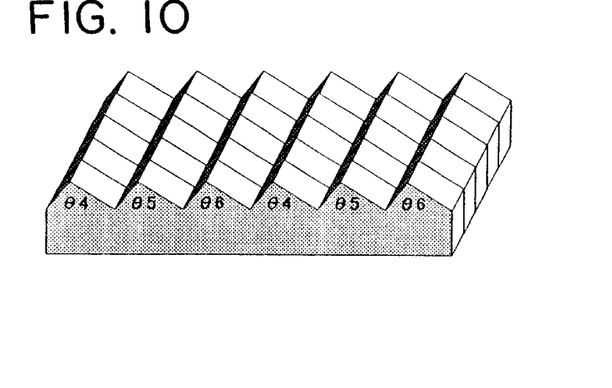
FIG. 10 is a perspective view of a group of flat sheets in which asymmetrical roof-shaped projections having optical axes titled in the same direction and having three different vertical angles are formed.
Figure 11:
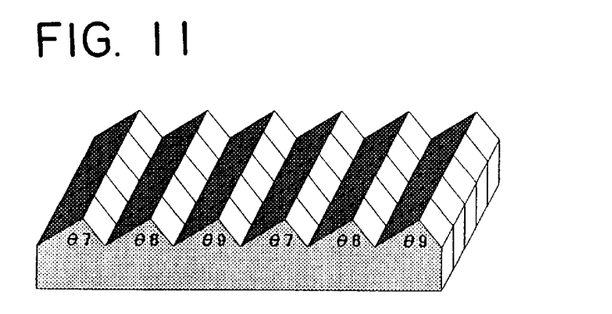
FIG. 11 is a perspective view of a group of flat sheets in which similar asymmetrical roof-shaped projections having optical axes titled in the direction opposite to that shown in FIG. 10 and having three different vertical angles are formed.
Figure 12:
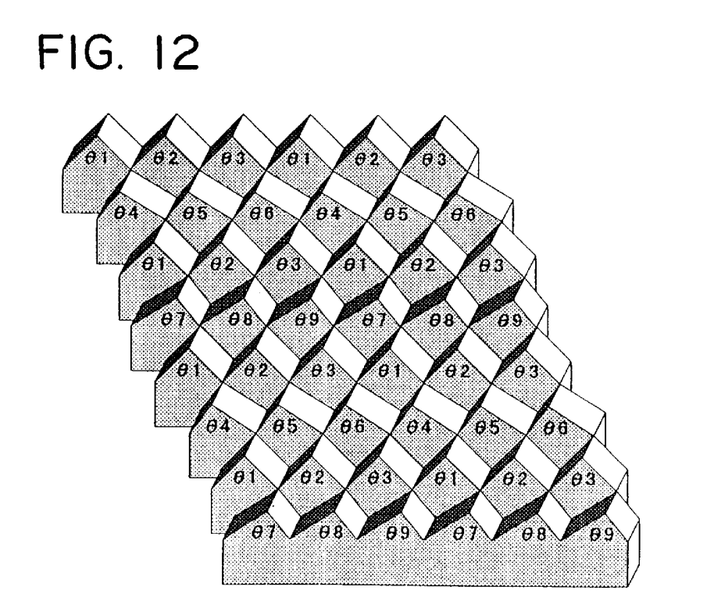
FIG. 12 is a perspective view of a cube-corner type microprism master mold in accordance with still another embodiment of the present invention which is formed from a combination of the three types of flat sheets illustrated in FIGS. 5, 10 and 11.

FIG. 10 is a perspective view of a group of flat sheets in which asymmetrical roof-shaped projections having optical axes titled in the same direction and having three different vertical angles are formed, FIG. 11 is a perspective view of a group of flat sheets in which similar asymmetrical roof-shaped projections having optical axes titled in the direction opposite to that shown in FIG. 10 and having three different vertical angles are formed, and FIG. 12 is a perspective view of a cube-corner type microprism master mold in accordance with still another embodiment of the present invention which is formed from a combination of the three types of flat sheets illustrated in FIGS. 5, 10 and 11. Thus, as illustrated in FIG. 12, the vertical angles of the roof-shaped projections and the directions of the optical axes can be varied in various ways.

FIGS. 10 and 11 illustrate that the vertical angles $\theta 4$, $\theta 5$, $\theta 6$, $\theta 7$, $\theta 8$ and $\theta 9$ of the roof-shaped projections are different angles which are equal to 90° or deviate slightly from 90°, and they are formed in a repeating pattern.

Incident Angle Characteristics (2)—Flat Sheet Thickness:

The above-described method for tilting the optical axes is effective only in tilting the optical axes in directions parallel to the major surfaces of the flat sheets used. However, by using flat sheets having a thickness equal to 0.6–2.0 times the length of the shorter oblique sides of the roof-shaped projections, the optical axes can also be tilted in a direction perpendicular to the major surfaces of the flat sheets used. Now, an embodiment in which the optical axes are tilted with respect to directions parallel to the major surfaces of the flat surfaces is described below with reference to FIGS. 13, 14 and 16.

Figure 13:
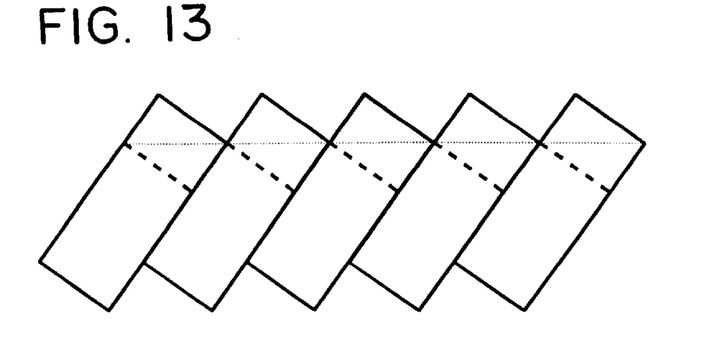
FIG. 13 is a side view of a cube-corner type microprism master mold formed from a group of flat sheets having a thickness equal to the length of the shorter oblique sides of the roof-shaped projections, as viewed from a direction perpendicular to the direction of the thickness of the flat sheets.
Figure 14:
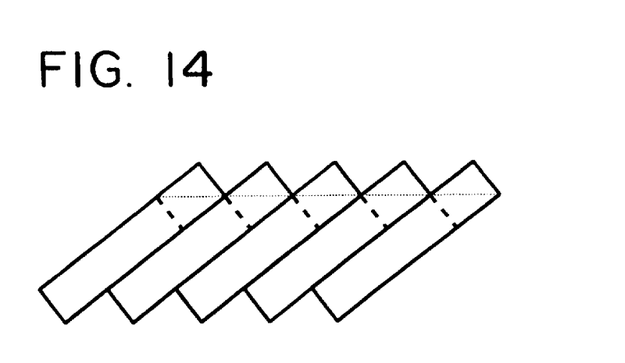
FIG. 14 is a side view of a cube-corner type microprism master mold formed from a group of flat sheets having a thickness equal to 0.7 time the length of the shorter oblique sides of the roof-shaped projections, as viewed from a direction perpendicular to the direction of the thickness of the flat sheets.
Figure 16:
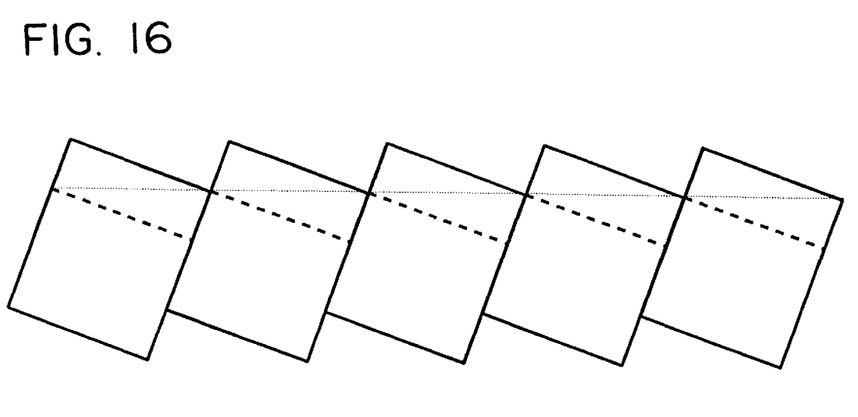
FIG. 16 is a side view of a cube-corner type microprism master mold formed from a group of flat sheets having a thickness equal to 1.5 times the length of the shorter oblique sides of the roof-shaped projections, as viewed from a direction perpendicular to the direction of the thickness of the flat sheets.

FIG. 13 is a side view of a cube-corner type microprism master mold formed from a group of flat sheets having a thickness equal to the length of the shorter oblique sides of the roof-shaped projections, as viewed from a direction perpendicular to the direction of the thickness of the flat sheets, FIG. 14 is a side view of a cube-corner type microprism master mold formed from a group of flat sheets having a thickness equal to 0.7 time the length of the shorter oblique sides of the roof-shaped projections, as viewed from a direction perpendicular to the direction of the thickness of the flat sheets, and FIG. 16 is a side view of a cube-corner type microprism master mold formed from a group of flat sheets having a thickness equal to 1.5 times the length of the shorter oblique sides of the roof-shaped projections, as viewed from a direction perpendicular to the direction of the thickness of the flat sheets.

Specifically, the method for tilting the optical axes in a direction perpendicular to the flat sheets comprises fabricating a cube-corner type prism array master mold in the same manner as described above, except that flat sheets having a suitable thickness equal to 0.6–2.0 times, preferably 0.7–1.5 times, the length of the shorter oblique sides of roof-shaped projections to be formed. In the case of symmetrical roof-shaped projections, their oblique sides having an equal length are regarded as the shorter oblique sides.

If the thickness of the flat sheets used is less than 0.6 time the length of the shorter oblique sides of the V-shaped grooves or greater than 2.0 times that length, the optical axes will be tilted excessively. This is undesirable in that the retroreflection efficiency for light having a small angle of incidence (i.e., light incident on the sheeting from a direction substantially perpendicular thereto) is reduced. The tilt angle of the optical axes is about 15° when the thickness of the flat sheets is equal to 0.6 time the length of the shorter oblique sides of the V-shaped grooves, and also about 15° when the thickness of the flat sheets is equal to 2.0 times that length. Moreover, the area ratios of the three faces will undesirably be increased owing to excessive deformation of the prisms, resulting in a decrease in the proportion of light retroreflected by trihedral reflection. The optical axes of the prisms shown in FIG. 13 are perpendicular to a surface of the retroreflective sheeting which is parallel to a line connecting the vertices of the prisms. The optical axes of the prisms shown in FIGS. 14 and 16 are tilted to the right side of the drawing by about 10° and to the left side of the drawing by about 10°, respectively.

Thus, when flat sheets having the same thickness are used, the optical axes are tilted in only one direction perpendicular to the flat sheets. According to the present invention, the optical axes can be tilted in two or more different directions perpendicular to the major surfaces of the flat sheets by combining two or more types of prism subarrays formed with flat sheets groups having different thicknesses.

Figure 18:
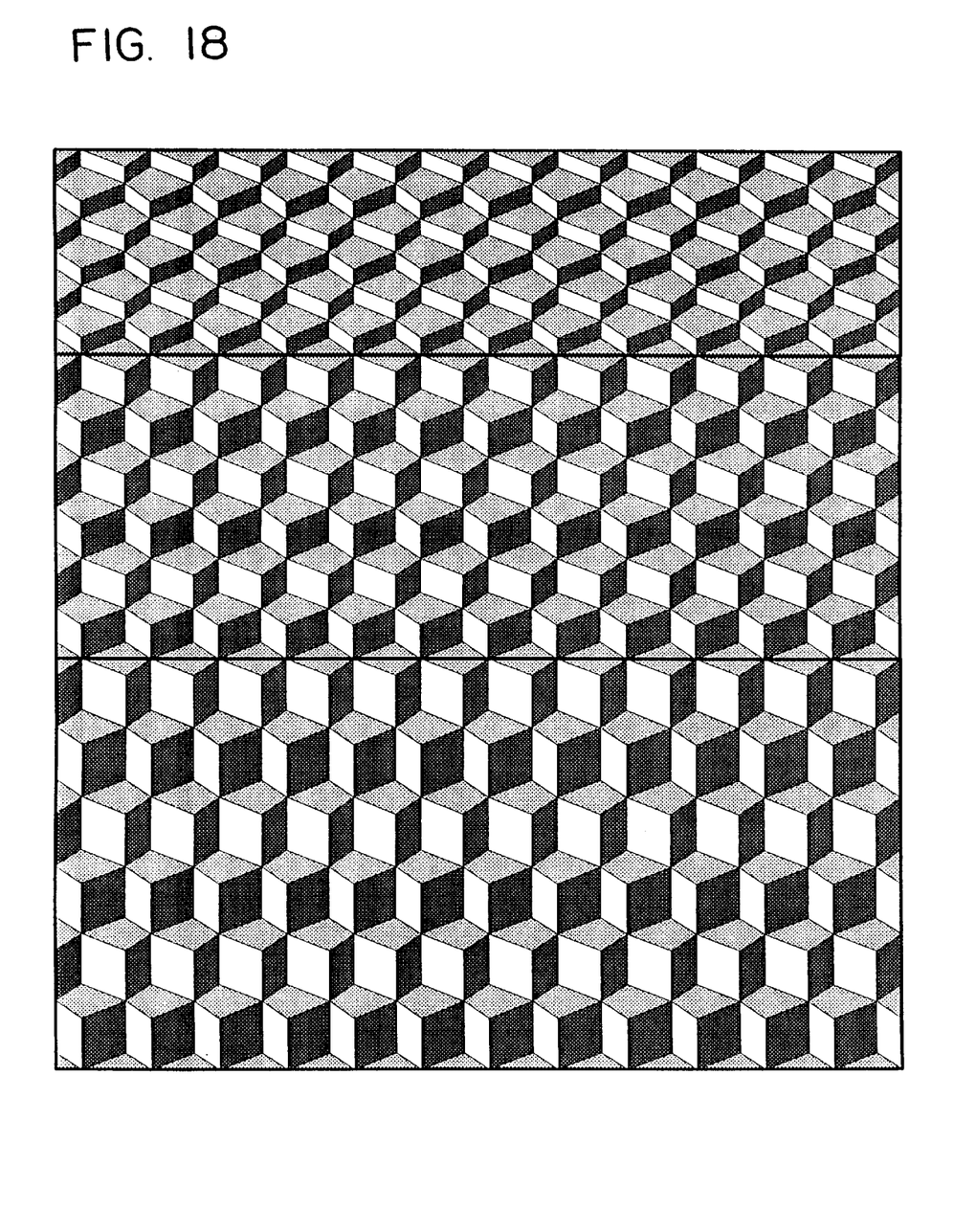
FIG. 18 is a perspective view of a microprism master mold obtained by combining three types of microprism subarrays formed from three groups of flat sheets having thicknesses which are identical in each group but different from group to group.

Furthermore, the present invention makes it possible to form a prism array having optical axes tilted in all directions by combining the above-described two tilting methods, i.e., the method for tilting the optical axes in directions parallel to the flat sheets and the method for tilting the optical axes in directions perpendicular to the flat sheets. FIG. 18 illustrates a microprism master mold obtained by combining three types of microprism subarrays formed from three groups of flat sheets having thicknesses which are identical in each group but different from group to group.

Rotation Angle Characteristics:

Since the prism elements employed in the present invention are in the shape of hexagonal prisms as contrasted with triangular prisms which are commonly used in thin retroreflective sheeting, they tend to exhibit uniform retroreflection performance for light incident on the sheeting from various directions. The reason for this is that, since the shape of the hexagonal prisms employed herein resembles a circle more closely than that of triangular prisms, the failure of trihedral reflection occurs less frequently, resulting in only a slight reduction in rotation angle characteristics. The approximate region of a prism element in which trihedral reflection can be achieved is represented by the inscribed circle thereof, and this occupies about 60% of the projected area of the prism element for triangular prisms and about 90% for hexagonal prisms. Thus, the prisms of the present invention are improved not only in rotation angle characteristics but also in reflective brightness itself. Moreover, the proportion of the effective area is about 38% when the thickness of the flat sheets is equal to 0.6 time the length of the shorter oblique sides of the V-shaped grooves and 65% when the thickness of the flat sheets is equal to 2.0 times the shorter oblique side thereof. Accordingly, variation of the thickness of the flat sheets beyond these limits is undesirable because a significant decrease in effective area will be caused.

Furthermore, as contrasted with conventional hexagonal prisms, the optical axes of the prism elements of the present invention are tilted in directions parallel and perpendicular to the flat sheets as explained above. This brings about a further improvement in rotation angle characteristics.

No particular limitation is placed on the size of the prism master mold of the present invention. However, since retroreflectors formed with this prism master mold generally have the form of relatively flexible and thin sheeting for use, for example, in signs such as road signs and construction signs, license plates for vehicles such as automobiles and motorcycles, safety goods such as safety clothing and life-saving devices, markings such as signboards, and reflectors for visible light or laser light reflection sensors, a typical example of the size of the prism master mold is one obtained by using flat sheets having a thickness of 50 to 500 $\mu$m and preferably 60 to 200 $\mu$m. If the thickness of the flat sheets is 50 $\mu$m or greater, they undergo little distortion during cutting, resulting in an improvement in the optical accuracy of the prisms so formed. Moreover, since the aperture area of the prisms is not too small, excessive spreading of reflected light due to a diffraction effect can desirably be prevented. On the other hand, if the thickness of the flat sheets is 500 $\mu$m or less, this desirably facilitates the formation of thin and flexible retroreflective sheeting which is one object of the present invention.

Then, the surface of the microprism master mold of the present invention is subjected to an electroforming process for forming a metal coating thereon. Then, this metal coating may be removed from the surface of the master mold to obtain a metallic mold for use in the molding of cube-corner type retroreflectors such as microprism sheeting.

In the case of a microprism master mold made of metal, its surface may be cleaned as required and directly subjected to an electroforming process. However, in the case of a microprism master mold made of synthetic resin, the prism faces of the master mold must be subjected to a conductivity treatment for imparting electrical conductivity thereto, prior to an electroforming process. For this conductivity treatment, there may be employed, for example, silvering, electroless plating, vacuum evaporation or cathode sputtering.

According to a specific silvering process, the surface of the master mold formed in the above-described manner is cleaned with an alkaline detergent or the like to remove any contaminants (e.g., oily matter) therefrom, activated with a surface activator such as tannic acid, and then silvered quickly with the aid of a silver nitrate solution. For this silvering purpose, there may be employed, for example, a spray process in which an aqueous solution of silver nitrate and an aqueous solution of a reducing agent (e.g., glucose or glyoxal) are sprayed with a double-cylinder nozzle gun, or a dipping process in which the master mold is dipped into a mixture of an aqueous solution of silver nitrate and an aqueous solution of a reducing agent. The silver coating should preferably be as thin as possible, so long as electrical conductivity is secured during electroforming. For example, its thickness may be 0.1 $\mu$m or less.

For the purpose of electroless plating, copper, nickel and the like may be used. In an electroless nickel plating solution, a water-soluble nickel salt such as nickel sulfate or nickel chloride may be used. Moreover, a complexing agent comprising a solution containing a salt of citric acid or malic acid as a principal component, and a reducing agent such as sodium hypophosphite, sodium borohydride or aminoborane are added to the plating solution.

Vacuum evaporation may be carried out by cleaning the surface of the master mold in the same manner as for silvering, placing the master mold in a vacuum chamber, and vaporizing a metal (e.g., gold, silver, copper, aluminum, zinc, nickel, chromium or selenium) therein by the application of heat to deposit it on the cooled surface of the master mold and thereby form an electrically conductive coating. Cathode sputtering may be carried out by using a vacuum chamber provided therein with a smooth cathode plate on which a desired metal foil can be mounted, and an anode stand made of a metal such as aluminum or iron and serving to place thereon a material to be treated. The master mold pretreated in the same manner as for silvering is placed on the anode stand, and a metal foil similar to that used for vacuum evaporation is mounted on the cathode and a voltage is applied thereto so as to cause a glow discharge. The resulting stream of positive ions is made to impinge on the metal foil of the cathode, so that metal atoms or fine particles are evaporated and deposited on the surface of the master mold to form an electrically conductive coating thereon. The electrically conductive coatings formed by these methods may have a thickness of, for example, 300 Å.

In order to form a smooth and uniform electroformed layer on the synthetic resin prism master mold during electroforming, the whole surface of the master mold must be uniformly subjected to the above-described conductivity treatment. If the conductivity treatment is not uniform, defects may develop, for example, in that the smoothness of the surface of the electroformed layer is reduced or the formation of an electroformed layer is omitted, in regions having poor electrical conductivity.

In order to avoid such defects, there may be employed, for example, a method in which, immediately before silvering, the surface to be silvered is treated with a solvent such as alcohol to improve its wettability by the silvering solution. However, since the synthetic resin prism master mold formed according to the present invention has very deep and sharp recesses, its improvement in wettability tends to be insufficient. Defects of the electrically conductive coating due to the shape of such recesses also tend to develop during vacuum evaporation and the like.

Moreover, if the flat sheets of synthetic resin stacked to form a master mold have a nonuniform thickness, these flat sheets may fail to come into close contact with each other. As a result, defects tend to develop, for example, in that the electrically conductive coating formed on the surface of the master mold may be broken at the interfaces between the flat sheets. All of these defects will interfere with the formation of a uniform electroformed layer.

In order to avoid such defects, both major surfaces of the flat sheets of synthetic resin used for the formation of a master mold may be subjected to a preliminary conductivity treatment as described previously. Since this preliminary conductivity treatment serves to improve wettability by a silvering solution and, in particular, to improve electrical conductivity between sheets, it is particularly effective in eliminating defects due to poor contact of the sheets.

The synthetic resin master mold having an electrically conductive coating formed thereon is subjected to various pretreatments so that uniform electroforming may be effected.

In order to obtain an electroformed layer having a smooth surface as a result of electroforming, an activation treatment is often carried out. For this activation treatment, there may be employed, for example, a method which comprises dipping the master mold into a 10 wt. % aqueous solution of sulfamic acid.

When the synthetic resin master mold having undergone silvering is subjected to electroforming, the silver layer becomes integral with the electroformed layer and can hence be easily stripped from the synthetic resin master mold. However, when an electrically conductive coating of nickel or the like is formed by electroless plating or cathode sputtering, the contact between the synthetic resin surface and the electrically conductive coating is so good that, after electroforming, it may be difficult to strip the electroformed layer from the synthetic resin layer. In such a situation, it is advisable to subject the electrically conductive coating to a so-called stripping treatment (e.g., a chromate treatment) prior to electroforming. In this case, the electrically conductive coating remains on the synthetic resin layer after the electroformed layer is stripped.

After these various pretreatments, the synthetic resin prism master mold having an electrically conductive coating formed thereon is subjected to an electroforming process in which an electroformed layer is produced on the electrically conductive coating. In the case of a metallic prism master mold, its surface is cleaned as required, and an electroformed layer is produced directly on the metal, as described previously.

The electroforming process is generally carried out, for example, in a 60 wt. % aqueous solution of nickel sulfamate and under conditions including a temperature of 40° C. and a current density of about 10 A/dm². A uniform electroformed layer can readily be obtained by adjusting the deposition rate of the electroformed layer, for example, to about 48 hours/mm or less. If the deposition rate is higher, defects such as poor smoothness of the surface and omissions in the electroformed layer tend to develop.

In the electroforming process, nickel-cobalt alloys containing cobalt and other components may also be used in order to improve the surface abrasion resistance of the resulting mold. The Vickers hardness (Hv) of the resulting electroformed layer can be increased to 300–400 by adding 10–15% by weight of cobalt. Consequently, the durability of the mold can be improved when a synthetic resin is molded by use of the resulting electroformed mold to produce microprism sheeting as a retroreflector product.

The first-generation electroformed mold made in the above-described manner may be repeatedly used as an electroforming master for making second-generation electroformed molds. Thus, a plurality of electroformed molds may be made from one prism master mold.

A plurality of electroformed molds so made may be precisely cut into sections. These sections may be combined and joined together so as to give a final mold size suitable for the molding of a synthetic resin into microprism sheeting. For joining purposes, there may employed, for example, a method in which the cut ends are simply butted with each other, or a method in which the joints of the combined sections are welded according to a technique such as electron beam welding, YAG laser welding or carbon dioxide laser welding.

The electroformed mold so combined is used as a mold for the molding of synthetic resins. As the method for the molding of synthetic resins, there may be employed compression molding or injection molding.

Compression molding may be carried out, for example, by inserting a thin-walled electroformed mold formed of nickel, synthetic resin sheeting of predetermined thickness, and about 5 mm thick silicone rubber sheeting as a cushioning material into a compression molding press, preheating them for 30 seconds under a pressure equal to 10–20% of the molding pressure, and then heating and pressing them at a temperature of 180–250° C. and a pressure of about 10–30 kg/cm² for about 2 minutes. Thereafter, they are cooled to room temperature in the pressed state and the pressure is released to obtain a molded prism article.

Alternatively, an article in the form of continuous sheeting may also be produced as follows. For example, a thin-walled (about 0.5 mm thick) electroformed mold made in the above-described manner is joined according to a welding process as described above to form an endless belt mold. This belt mold is mounted on a pair of rolls comprising a heating roll and a cooling roll, and allowed to travel. While the belt mold is lying on the heating roll, a molten synthetic resin in the form of sheeting is fed thereto and pressed with one or more silicone rolls. Thereafter, the synthetic resin sheeting is cooled on the cooling roll to a temperature lower than its glass transition temperature and stripped from the belt mold to obtain a desired article.

EXAMPLES

The present invention is further illustrated by the following examples.

Example 1
(the embodiment corresponding to FIGS. 5 and 6)

A total of 1,000 flat sheets made of polyethylene terephthalate (PET; with a softening point of 220° C. and a Rockwell hardness of 70) and measuring 75 mm×200 mm×100 μm were stacked to form a PET block measuring 75 mm×200 mm×100 mm. Using a fastening jig, two faces of this block were firmly secured so that the PET sheets would not move during cutting. Then, according to a fly cutting process, an edge face of this fastened block was planed in a direction perpendicular to the major surfaces of the sheets.

Next, according to a fly cutting process in which the bottom angles of V-shaped grooves formed with a diamond cutting tool were slightly varied in regular order, three types of symmetrical V-shaped grooves having depths of 70.6 μm, 70.7 μm and 70.9 μm were successively and repeatedly cut at a repeating pitch of 141.4 μm in a direction perpendicular to the major surfaces of the sheets. Thus, a series of successive roof-shaped projections having three different vertical angles of 89.9°, 90.0° and 90.1° in a repeating pattern were formed on one edge of the sheets. The ratio of the thickness of the sheets to the length of the oblique sides of the roof-shaped projections was 1.000 (the formation of a series of roof-shaped projections a: FIG. 5).

In the resulting bundle of flat sheets having a series of roof-shaped projections formed in a repeating pattern, each sheet was first shifted in the direction of the major surfaces of the sheet by one-half the repeating pitch of the V-shaped grooves, and then in the direction of the depth of the V-shaped grooves by the depth of the V-shaped grooves, so that the vertices of the series of roof-shaped projections formed on the sheet were made to meet the bottoms of the V-shaped grooves in an adjacent series of roof-shaped projections. Thus, a microprism master mold having three different vertical angles was formed (prism master mold A: FIG. 6).

Example 2
(the embodiment corresponding to FIGS. 7, 8 and 9)

In this example, flat sheets obtained by depositing gold on both major surfaces of 100 μm thick PET sheeting by vacuum evaporation and then cutting the sheeting into pieces having a width of 75 mm and a length of 200 mm were used in place of the 75 mm×200 mm×100 μm PET sheets used in Example 1. Then, a series of roof-shaped projections tilted to the left side of the drawing by 8° (with a V-shaped groove tilt angle of −8°) were formed in the same manner as in Example 1, except that, instead of cutting symmetrical V-shaped grooves while varying slightly the bottom angles of V-shaped grooves formed with a diamond cutting tool in regular order, asymmetrical V-shaped grooves were cut by tilting the cutting angle of the V-shaped grooves to the left side of the drawing by 8° without varying the bottom angles of the V-shaped grooves. The ratio of the thickness of the sheets to the length of the shorter oblique sides of the roof-shaped projections was 0.928 (the formation of a series of roof-shaped projections b: FIG. 7).

Next, a series of roof-shaped projections tilted to the right side of the drawing by 8° (with a V-shaped groove tilt angle of +8°) were formed in the same manner as described above, except that the cutting angle of the V-shaped grooves was tilted to the right side of the drawing by 8°. The ratio of the thickness of the sheets to the length of the shorter oblique sides of the roof-shaped projections was 0.928. This series of projections might be obtained by reversing the aforesaid series of roof-shaped projections b sideways (the formation of a series of roof-shaped projections c: FIG. 8).

The two types of roof-shaped projections b and c formed in the above-described manner were alternately combined in the order of b–c. Thus, there was obtained a bundle of sheets in which the two types of roof-shaped projections were rearranged. In this bundle of rear-ranged sheets, each sheet was first shifted in the direction of the major surfaces of the sheet by one-half the repeating pitch of the V-shaped grooves, and then in the direction of the depth of the V-shaped grooves by the depth of the V-shaped grooves, so that the vertices of the series of roof-shaped projections formed on the sheet were made to meet the bottoms of the V-shaped grooves in an adjacent series of roof-shaped projections. Thus, a microprism master mold B having optical axes titled in two opposite directions was formed (prism master mold B: FIG. 9).

Example 3
(the embodiment corresponding to FIGS. 5, 10, 11 and 12)

In this example, flat sheets made of polymethyl methacrylate (PMMA; with a softening point of 180° C. and a Rockwell hardness of 98) and having the same thickness were used in place of the 75 mm×200 mm×100 µm PET sheets used in Example 1. Then, a series of successive roof-shaped projections tilted to the left side of the drawing by 8° (with a V-shaped groove tilt angle of −8°) and having three different vertical angles of 89.9°, 90.0° and 90.1 in a repeating pattern were formed in the same manner as in Example 1, except that, instead of cutting symmetrical V-shaped grooves while varying slightly the bottom angles of V-shaped grooves formed with a diamond cutting tool in regular order, asymmetrical V-shaped grooves were cut by varying slightly the bottom angles of the V-shaped grooves and, at the same time, tilting the cutting angle of the V-shaped grooves to the left side of the drawing by 8°. The ratio of the thickness of the sheets to the length of the shorter oblique sides of the roof-shaped projections was 1 (the formation of a series of roof-shaped projections d: FIG. 10).

Next, a series of successive roof-shaped projections tilted to the right side of the drawing by 8° (with a V-shaped groove tilt angle of +8°) and having three different vertical angles of 89.9°, 90.0° and 90.1° in a repeating pattern were formed in the same manner as described above, except that the cutting angle of the V-shaped grooves was tilted to the right side of the drawing by 8°. The ratio of the thickness of the sheets to the length of the shorter oblique sides of the roof-shaped projections was 1. This series of projections might be obtained by reversing the aforesaid series of roof-shaped projections A sideways (the formation of a series of roof-shaped projections e: FIG. 11).

Moreover, a series of roof-shaped projections a (corresponding to FIG. 5) were formed in the same manner as in Example 1, except that 75 mm×200 mm×100 µm PMMA sheets were used in place of the 75 mm×200 mm×100 µm PET sheets used in Example 1.

The three types of roof-shaped projections a, d and e formed in the above-described manner were regularly combined in the order of a-d-a-e. Thus, there was obtained a bundle of sheets in which the three types of roof-shaped projections were rearranged. In this bundle of rearranged sheets, each sheet was first shifted in the direction of the major surfaces of the sheet by one-half the repeating pitch of the V-shaped grooves, and then in the direction of the depth of the V-shaped grooves by the depth of the V-shaped grooves, so that the vertices of the series of roof-shaped projections formed on the sheet were made to meet the bottoms of the V-shaped grooves in an adjacent series of roof-shaped projections. Thus, a microprism master mold C having three different vertical angles and having optical axes titled in three different directions was formed (prism master mold C: FIG. 12).

Example 4
(the embodiment corresponding to FIGS. 9, 15, 17 and 18)

Figure 15:
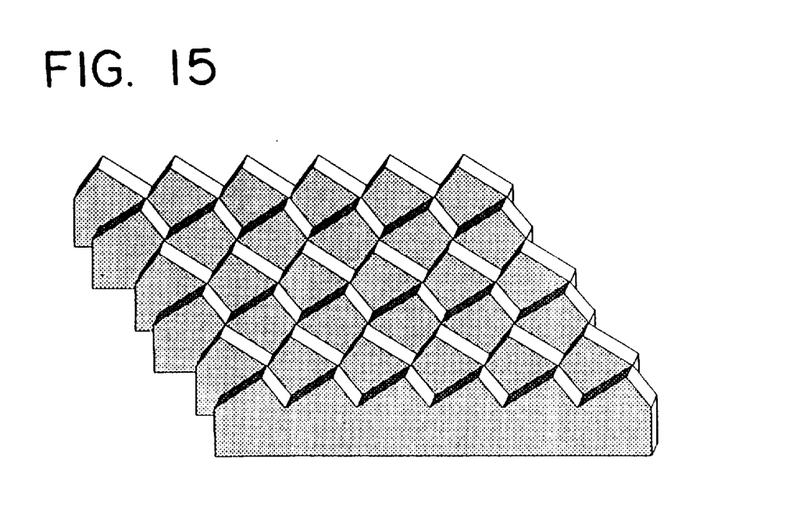
FIG. 15 is a perspective view of a cube-corner type microprism master mold formed in the same manner as illustrated in FIG. 9, by using flat sheets having a thickness equal to 0.7 time the length of the shorter oblique side of the roof-shaped projections.
Figure 17:
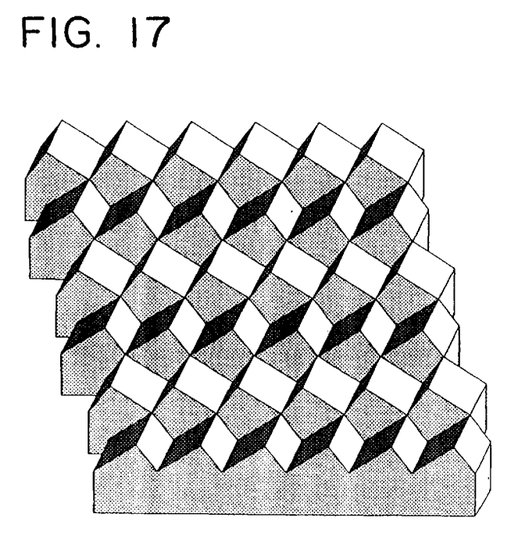
FIG. 17 is a perspective view of a cube-corner type microprism master mold formed in the same manner as illustrated in FIG. 9, by using flat sheets having a thickness equal to 1.5 times the length of the shorter oblique sides of the roof-shaped projections.

A microprism master mold D (in which the ratio of the thickness of the sheets to the length of the shorter oblique sides of the roof-shaped projections was 0.7) was formed in the same manner as in Example 2, except that the 100 µm thick PET sheeting was replaced by 75 µm thick PET sheeting, and flat sheets obtained by depositing gold on both major surfaces of the sheeting by vacuum evaporation and then cutting it into pieces having a width of 75 mm and a length of 200 mm were used. Moreover, a microprism master mold E (in which the ratio of the thickness of the sheets to the length of the shorter oblique sides of the roof-shaped projections was 1.5) was formed in the same manner as in Example 2, except that the 100 µm thick PET sheeting was replaced by 125 µm thick PET sheeting, and flat sheets obtained by depositing gold on both major surfaces of the sheeting by vacuum evaporation and then cutting it into pieces having a width of 75 mm and a length of 200 mm were used (prism master mold D: FIG. 15; prism master mold E: FIG. 17).

Subsequently, the surface of the resulting prism master mold D was cleaned with an alkaline detergent and activated with tannic acid used as a surface activator. Then, according to a spray method using a double-cylinder nozzle gun containing an aqueous solution of silver nitrate and an aqueous solution of a reducing agent, the surface of the master mold was silvered to form an electrically conductive coating thereon. This master mold having an electrically conductive coating formed thereon was dipped into a 10 wt. % aqueous solution of sulfamic acid to activate the surface of the electrically conductive coating, and then subjected to an electroforming process which was carried out in a 60 wt. % aqueous solution of nickel sulfamate at 40° C. and 8 A/dm$^2$ for 48 hours.

The electroformed layer obtained by the electroforming process was stripped from the master mold to obtain a 0.8 mm thick electroformed nickel layer D' having thereon a reversed pattern of cube-corner elements. Similarly, electroformed nickel layers E' and B' were obtained from prism master mold E and prism master mold B formed in Example 2.

According to a fly cutting process using a diamond cutting tool, these electroformed nickel layers were cut along rows of aligned prisms into strips having a length of 180 mm and a width of 5 mm. Such nickel layer strips having thereon three different reversed patterns of microprism master molds were repeatedly arranged on the order of B'-D'-B'-E' without leaving any space therebetween. Thus, a prism array surface having the form of a tile measuring 180 mm×200 mm was formed.

Furthermore, using this prism array surface, a nickel electroforming process was carried out in the same manner as described above to form a prism master mold F (prism master mold F: FIG. 18).

Exploitability in Industry

In the present invention, the beam of retroreflected light can be uniformly distributed with a controlled degree of divergence, by varying the vertical angles of roof-shaped projections so as to give various vertical angles as described above. This makes it possible to form a prism master mold having excellent observation angle characteristics.

Moreover, in the present invention, the optial axes of prisms can be tilted at various angles in directions parallel and perpendicular to the major surfaces of flat sheets used, by varying the tilt angles of V-shaped grooves and the thickness of the flat sheets as described above. Thus, the retroreflective brightness can be prevented from being significantly reduced as the angle of incidence increases. This makes it possible to form prisms having excellent incident angle characteristics.

Furthermore, in the prism master mold of the present invention, observation angle characteristics and incident angle characteristics are improved by using hexagonal prisms. As a result, it becomes possible to form prisms also having excellent rotation angle characteristics and high brightness properties which are inherently possessed by hexagonal prisms.

What is claimed is:

1. A microprism master mold comprising a plurality of flat sheets having two mutually parallel major surfaces and provided on one edge thereof with a series of V-shaped grooves having a bottom angle of about 90° and roof-shaped projections having a vertical angle of about 90° which are successively formed at a fixed repeating pitch and in a direction perpendicular to the major surfaces, said flat sheets being stacked so that the vertices of the roof-shaped projections formed on each flat sheet meet the bottoms of the V-shaped grooves formed on an adjacent flat sheet, characterized in that said microprism master mold includes two or more different roof-shaped projections and in that the thickness of each flat sheet is equal to 0.6–2.0 times the length of the shorter oblique sides of the roof-shaped projection.

2. A microprism master mold comprising a plurality of flat sheets having two mutually parallel major surfaces and provided on one edge thereof with a series of V-shaped grooves having a bottom angle of about 90° and roof-shaped projections having a vertical angle of about 90° which are successively formed at a fixed repeating pitch and in a direction perpendicular to the major surfaces, said flat sheets being stacked so that the vertices of the roof-shaped projections formed on each flat sheet meet the bottoms of the V-shaped grooves formed on an adjacent flat sheet, characterized in that said microprism master mold includes two or more different roof-shaped projections and in that the thickness of each flat sheet is equal to 0.6–2.0 times the length of the shorter oblique sides of the roof-shaped projections, and wherein the two or more different roof-shaped projections are roof-shaped projections having two or more different vertical angles.

3. A microprism master mold as claimed in claim 1 wherein the vertical angles are in the range of 89.83° to 90.17°.

4. A microprism master mold as claimed in claim 1 wherein the shape of the roof-shaped projections is symmetrical.

5. A microprism master mold comprising a plurality of flat sheets having two mutually parallel major surfaces and provided on one edge thereof with a series of V-shaped grooves having a bottom angle of about 90° and roof-shaped projections having a vertical angle of about 90° which are successively formed at a fixed repeating pitch and in a direction perpendicular to the major surfaces said flat sheets being stacked so that the vertices of the roof-shaped projections formed on each flat sheet meet the bottoms of the V-shaped grooves formed on an adjacent flat sheet, characterized in that said microprism master mold includes two or more different roof-shaped projections and in that the thickness of each flat sheet is equal to 0.6–2.0 times the length of the shorter oblique sides of the roof-shaped projections, and wherein the shape of the roof-shaped projections is asymmetrical.

6. A microprism master mold as claimed in claim 1 wherein the tilt angle of the V-shaped grooves is in the range of −15° to +15°.

7. A microprism master mold as claimed in claim 1 wherein the two or more different roof-shaped projections are formed on each flat sheet.

8. A microprism master mold as claimed in claim 1 wherein the two or more different roof-shaped projections are formed on different flat sheets.

9. A microprism master mold as claimed in claim 1 which comprises a combination of two or more microprism master molds each composed of a group of flat sheets having the same thickness.

10. A microprism master mold as claimed in claim 9 wherein the combined microprism master molds are composed of flat sheet groups differing in thickness from each other.

11. A microprism master mold as claimed in claim 1 wherein said flat sheets are made of a synthetic resin material, a metallic material or an alloy material.

12. A microprism master mold as claimed in claim 11 wherein the synthetic resin material is a synthetic resin having a glass transition point of 150° C. or above.

13. A microprism master mold as claimed in claim 11 wherein the synthetic resin material is selected from the group consisting of polyethylene terephthalate resin, polybutylene terephthalate resin, polycarbonate resins, polymethyl methacrylate resin, polyimide resins, polyarylate resins, polyethersulfone resins, polyetherimide resins and cellulose triacetate resin.

14. A microprism master mold as claimed in claim 11 wherein the metal is amorphous copper or electrodeposited nickel.

* * * * *